United States Patent
Lee et al.

(10) Patent No.: US 10,645,241 B2
(45) Date of Patent: May 5, 2020

(54) SOUND EMITTING DEVICE, IMAGE FORMING APPARATUS AND ELECTRONIC APPARATUS

(71) Applicant: FUJI XEROX CO., LTD., Tokyo (JP)

(72) Inventors: Bokryong Lee, Yokohama (JP); Naoya Koide, Yokohama (JP); Nobuyuki Sato, Yokohama (JP); Kei Otagiri, Yokohama (JP); Miho Kamata, Yokohama (JP); Toshihisa Naka, Yokohama (JP); Akio Fukuyama, Yokohama (JP); Satoru Kaiya, Yokohama (JP); Hiromasa Kanno, Yokohama (JP); Tatsuya Sato, Yokohama (JP); Osamu Takenouchi, Yokohama (JP); Yuki Ono, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 23 days.

(21) Appl. No.: 15/969,095

(22) Filed: May 2, 2018

(65) Prior Publication Data

US 2019/0098155 A1     Mar. 28, 2019

(30) Foreign Application Priority Data

Sep. 26, 2017   (JP) ................................ 2017-184518
Sep. 26, 2017   (JP) ................................ 2017-184519

(51) Int. Cl.
*H04N 1/00* (2006.01)
*H04R 1/02* (2006.01)
*H04R 1/28* (2006.01)

(52) U.S. Cl.
CPC ..... *H04N 1/00488* (2013.01); *H04N 1/00408* (2013.01); *H04R 1/028* (2013.01); *H04R 1/2865* (2013.01); *H04R 1/025* (2013.01); *H04R 2499/15* (2013.01)

(58) Field of Classification Search
CPC .......... H04R 1/028; H04R 1/30; H04R 1/345; H04R 5/02; H04R 5/023; H04R 1/025; H04R 2499/15; H04N 1/00488; H04N 1/00408
USPC ........ 381/333, 306, 388, 334, 340–343, 337
See application file for complete search history.

(56) References Cited

U.S. PATENT DOCUMENTS

| | | | |
|---|---|---|---|
| 5,576,522 A * | 11/1996 | Taso ..................... | H04R 1/2819 181/156 |
| 7,280,665 B2 * | 10/2007 | Tamura .................. | H04N 5/642 348/E5.13 |
| 7,796,772 B2 * | 9/2010 | Takahashi ............ | H04R 1/2819 361/679.23 |

(Continued)

FOREIGN PATENT DOCUMENTS

| | | | | |
|---|---|---|---|---|
| JP | 2005-156645 | * | 6/2005 | .............. G09F 9/00 |
| JP | 2012-156987 A | | 8/2012 | |

(Continued)

*Primary Examiner* — Xu Mei
(74) *Attorney, Agent, or Firm* — Oliff PLC

(57) ABSTRACT

A sound emitting device includes: a speaker that is provided at a back surface of a user interface device; a support body that supports the user interface device; a horn portion that is provided in the support body; and a space portion that is a space formed inside the support body and extending from a sound emission region of the speaker to the horn portion.

18 Claims, 12 Drawing Sheets

(56) References Cited

U.S. PATENT DOCUMENTS

| | | | | |
|---|---|---|---|---|
| 8,208,669 B2* | 6/2012 | Hamada | ............... | H04N 5/642 |
| | | | | 348/836 |
| 2007/0146987 A1* | 6/2007 | Sakata | ............... | F16M 11/10 |
| | | | | 361/679.01 |
| 2009/0168024 A1* | 7/2009 | Hayashi | ............... | G03B 31/00 |
| | | | | 353/15 |
| 2009/0238384 A1* | 9/2009 | Beauchamp | ............ | H04R 5/02 |
| | | | | 381/306 |
| 2011/0317131 A1* | 12/2011 | Miyazaki | ............ | G03B 21/204 |
| | | | | 353/31 |
| 2013/0279730 A1 | 10/2013 | Tanaka | | |
| 2014/0247959 A1 | 9/2014 | Yamanaka et al. | | |
| 2015/0163576 A1* | 6/2015 | Truong | ............... | H04R 1/028 |
| | | | | 381/333 |

FOREIGN PATENT DOCUMENTS

| | | |
|---|---|---|
| JP | 2014-171049 A | 9/2014 |
| JP | 2016-165854 A | 9/2016 |

* cited by examiner

SOUND EMITTING DEVICE, IMAGE FORMING APPARATUS AND ELECTRONIC APPARATUS

CROSS-REFERENCE TO RELATED APPLICATIONS

This application is based on and claims priority under 35 USC 119 from Japanese Patent Application No. 2017-184518 filed on Sep. 26, 2017 and Japanese Patent Application No. 2017-184519 filed on Sep. 26, 2017.

BACKGROUND

1. Technical Field

The present invention relates to a sound emitting device, an image forming apparatus and an electronic apparatus.

2. Related Art

Speakers may be mounted in electronic apparatuses such as image forming apparatuses in order to provide various notifications or information to users.

Units for performing various notifications to users are provided in the electronic apparatuses such as the image forming apparatuses.

SUMMARY

According to an aspect of the invention, there is provided a sound emitting device comprising: a speaker that is provided at a back surface of a user interface device; a support body that supports the user interface device; a horn portion that is provided in the support body; and a space portion that is a space formed inside the support body and extending from a sound emission region of the speaker to the horn portion.

BRIEF DESCRIPTION OF THE DRAWINGS

Exemplary embodiments of the present invention will be described in detail based on the following figures, wherein.

REFERENCE SIGNS LIST

100: image forming apparatus, 110: user interface device, 111: support body, 112: horn portion, 113: touch screen, 114: upper surface, 121: speaker portion, 122: sound passage space, 123: reflective member, 124: member, 125: member, 1251: first movable member, 1252: second movable member, 10: image forming apparatus, 11: body, 12: stand, 20: user interface device, 21: touch screen, 22: support portion, 23: display device, 231: light source, 232: support body, 233: posture changing body, 234: optical system, 235: adjustment mechanism, 236: shutter, 237: liquid crystal lens, 238: controller

DETAILED DESCRIPTION

First Exemplary Embodiment

Figure 1:
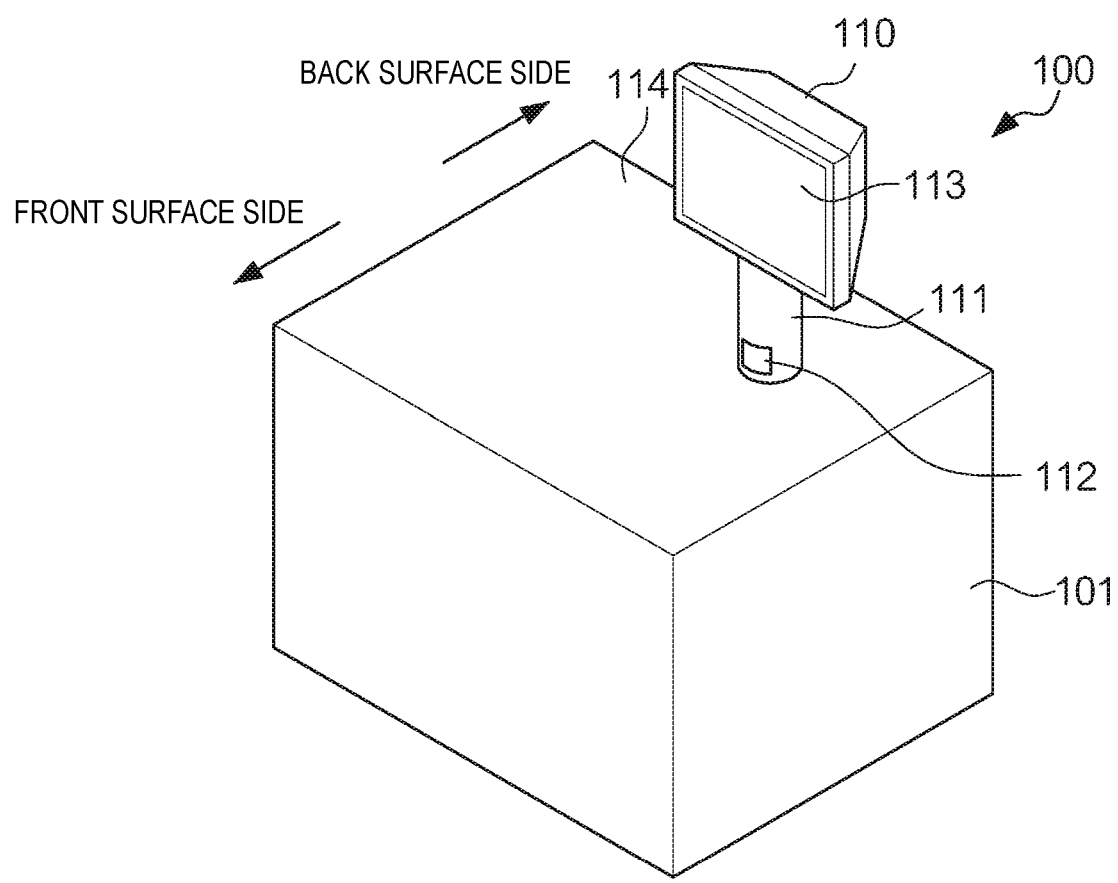
FIG. 1 is a view illustrating an external appearance configuration of an image forming apparatus according to a first exemplary embodiment.

FIG. 1 is a view illustrating an external appearance configuration of an image forming apparatus 100 that is an exemplary embodiment of the invention. The image forming apparatus 100 is an electrophotographic printer that corresponds to an example of an electronic apparatus according to the invention. The image forming apparatus 100 is provided with a user interface device 110 for accepting an operation from a user or displaying an image. At the same time, the image forming apparatus 100 is internally provided with an image forming portion that forms an image in response to the operation accepted by the user interface device 110, and a controller that performs control on the image forming portion. Incidentally, in the image forming apparatus 100, a side where the user operating the apparatus stands is referred to as "front surface side", and an opposite side to the front surface side is referred to as "back surface side".

The user interface device 110 is shaped like a plate with a predetermined thickness. The user interface device 110 is provided with a touch screen 113 on its front surface side. The user interface device 110 is supported on a body 101 of the image forming apparatus 100 by a columnar support body 111. A horn portion 112 having an opening portion facing the front is provided in the support body 111. Inside the user interface device 110, a not-shown speaker is disposed in a state in which a sound emission surface of the speaker faces the back. Sound emitted from the speaker is passed through an inside space of the support body 111 and then radiated from the horn portion 112 toward the front surface side of the image forming apparatus 100. The horn portion 112 is disposed at a position unable to be hidden by the user interface device 110 when seen from the user on the front surface side. Specifically, the horn portion 112 is disposed at a position under the user interface device 110 but above an upper surface 114 that is a housing surface of an uppermost portion of the image forming apparatus 100. An example of a sound emitting device according to the invention is constituted by the user interface device 110, the support body 111 and the speaker. A sound emission controller that controls sound emission of the sound emitting device is materialized by the controller provided internally in the image forming apparatus 100.

Figure 2:
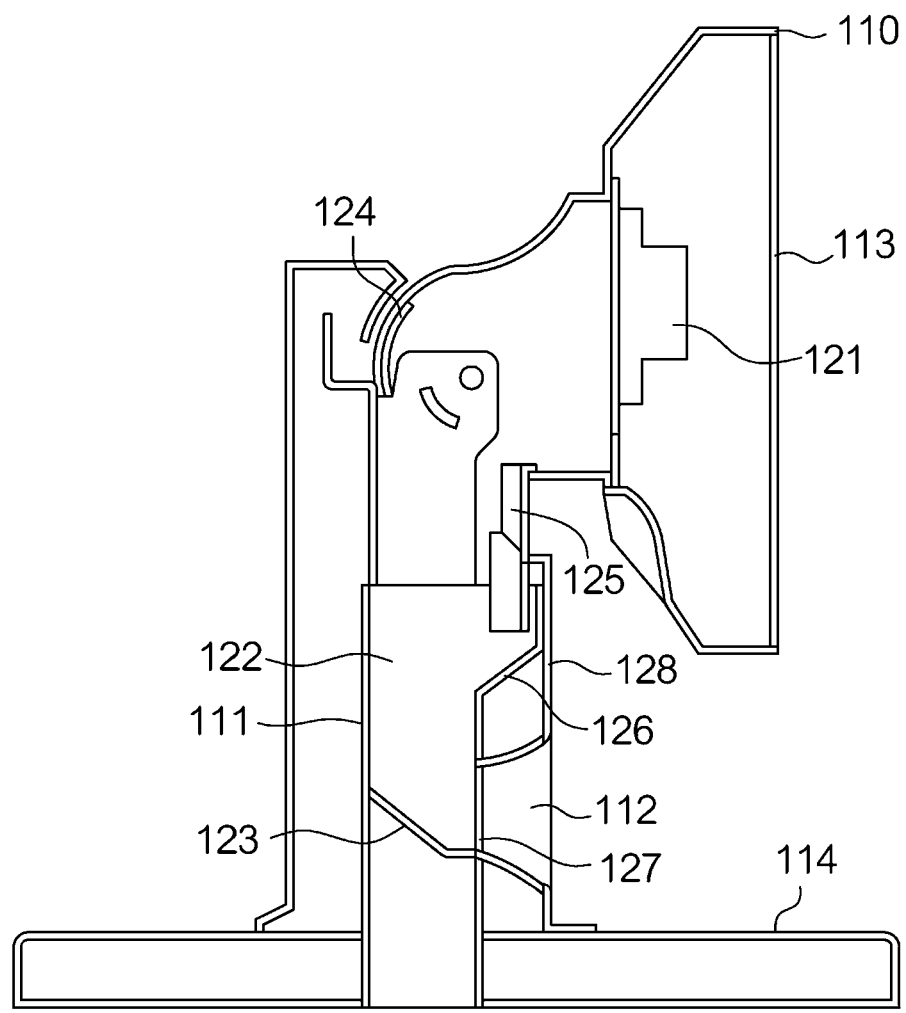
FIG. 2 is a sectional view of a user interface device in the image forming apparatus according to the first exemplary embodiment when the user interface device faces front.
Figure 3:
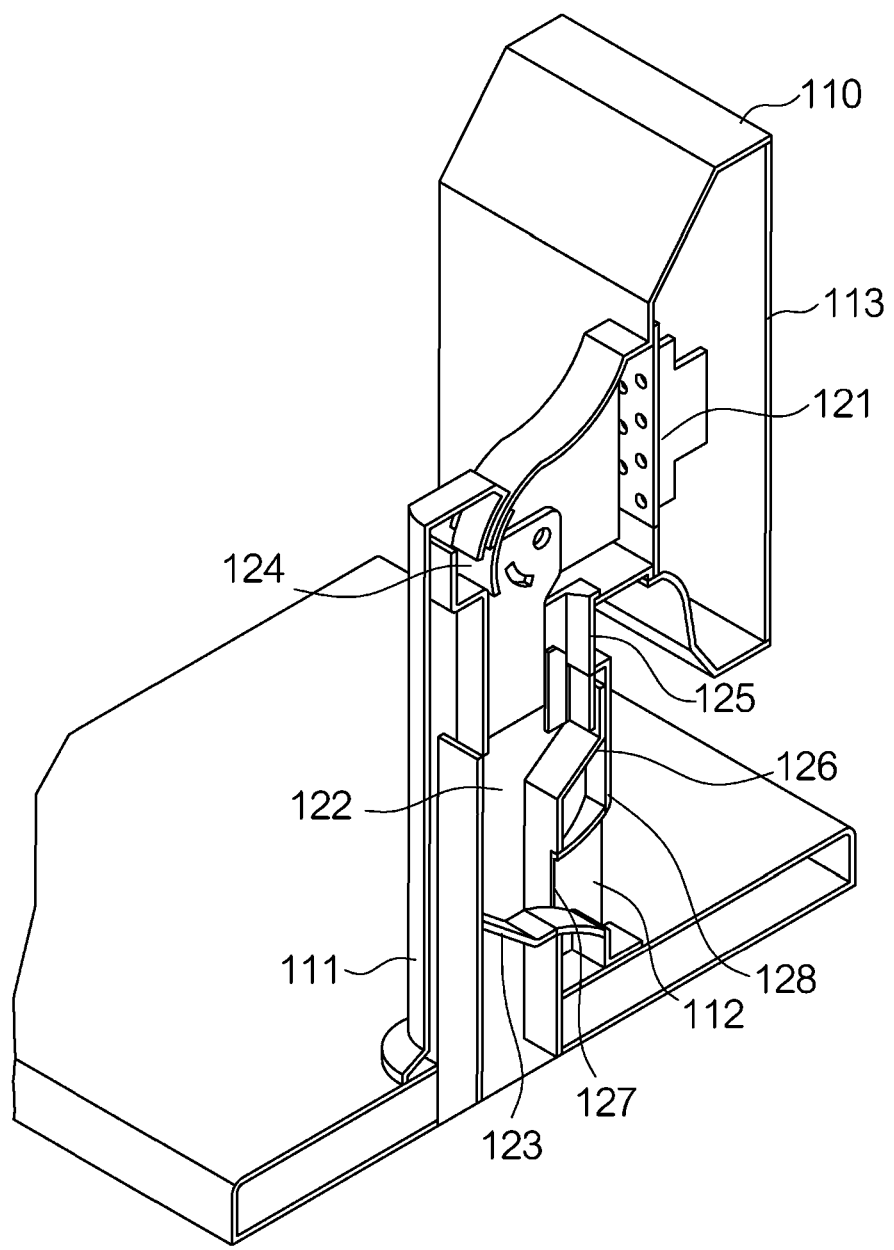
FIG. 3 is a sectional perspective view of the user interface device in the image forming apparatus according to the first exemplary embodiment when the user interface device faces front.

FIG. 2 is a sectional view of the user interface device 110 in the image forming apparatus 100 when the user interface device 110 faces the front. FIG. 3 is a sectional perspective view of the user interface device 110 in the image forming apparatus 100 when the user interface device 110 faces the front. Inside the user interface device 110, the speaker 121 is disposed in a state in which the sound emission surface of the speaker 121 faces the back. A sound passage space portion 122 is formed inside the support body 111 by a housing etc. of the support body 111. The sound passage space portion 122 is a space extending from the sound emission region of the speaker 121 to the horn portion 112. The support body 111 is constituted by a metal member 126 that is used from a viewpoint of securing strength, and a resin member 128 that covers the metal member 126 from a viewpoint of design or texture. The metal member 126 constituting the support body 111 is provided with a recess 127 having a hollow shape opened to the resin member 128 covering the metal member 126. The horn portion 112 is disposed in the recess 127. The horn portion 112 is formed by a resin member from a viewpoint of design or texture, and connected to the resin member 128 constituting the support body 111. Thus, a sensation of unity as the whole support body 111 can be maintained from the viewpoint of design or texture. The sound passage space portion 122 is connected to an outside space only through the opening portion of the horn portion 112.

The support body 111 is provided with a reflective member 123 in the sound passage space portion 122 so that the reflective member 123 can reflect the sound emitted from the speaker 121 in a direction where the horn portion 112 is located.

The support body 111 has a structure in which the sound passage space portion 122 inside the support body 111 is not exposed to the outside space of the support body 111 even when the posture or position of the user interface device 110 changes. Specifically, the support body 111 is provided with members 124 and 125 by which any gap that may be generated among plural members forming the sound passage space portion 122 when the posture or position of the user interface device 110 changes can be closed with respect to the outside space of the support body 111. Of them, the member 125 is disposed on the front surface side, and the member 124 is disposed on the back surface side. The member 125 serves as a movable member that moves following the change of the posture or position of the user interface device 110 so that the gap that may be generated among the plural members forming the sound passage space portion 122 when the posture or position of the user interface device 110 changes can be closed with respect to the outside space of the support body 111 by the movable member.

Figure 4:
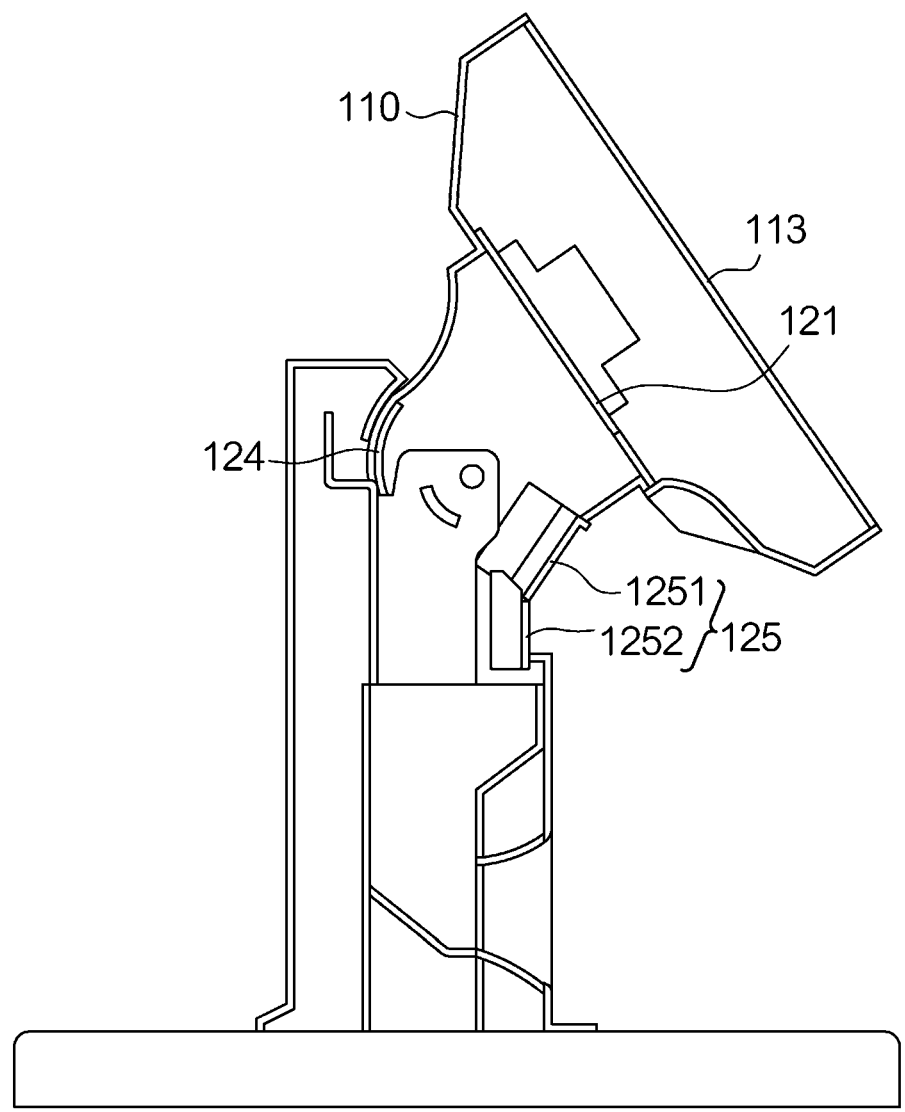
FIG. 4 is a sectional view of the user interface device in the image forming apparatus according to the first exemplary embodiment when the user interface device faces up.
Figure 5:
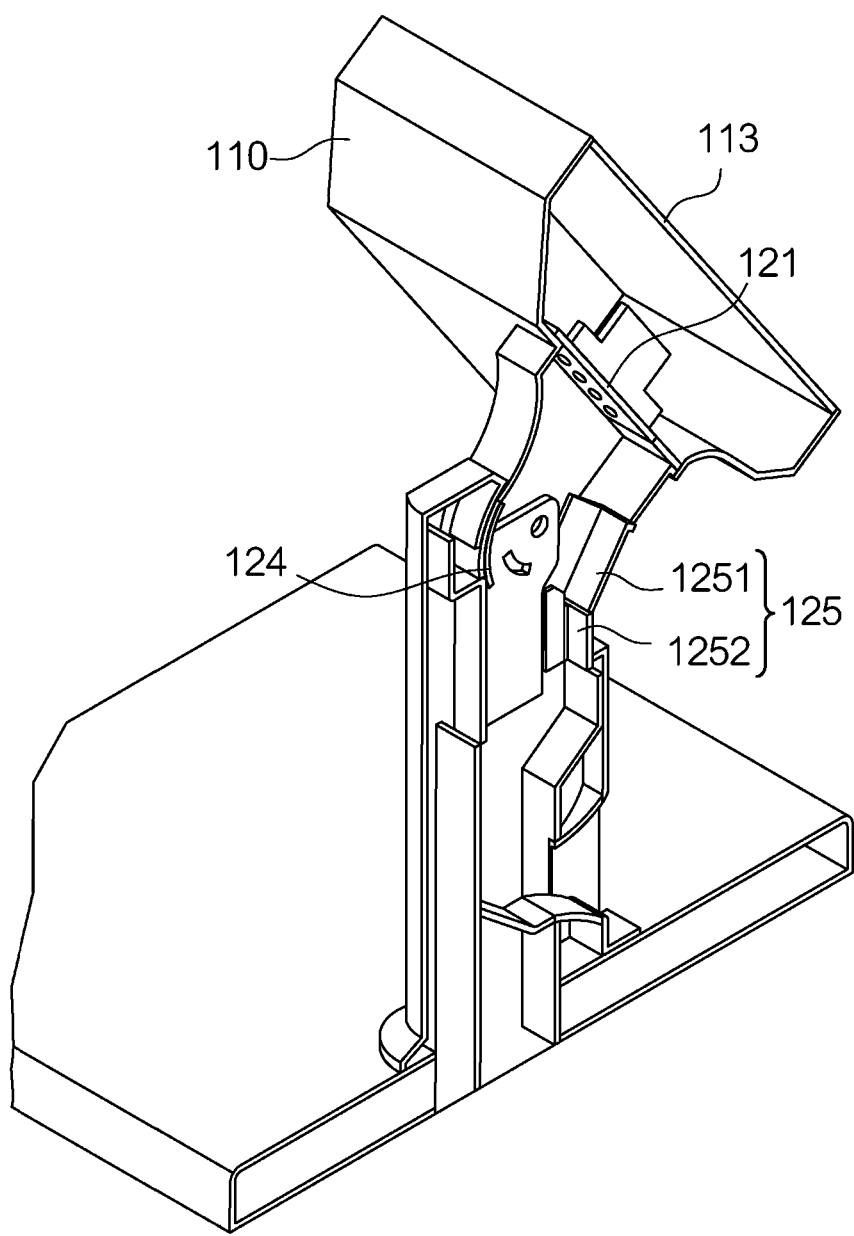
FIG. 5 is a sectional perspective view when the user interface device in the image forming apparatus according to the first exemplary embodiment faces up.

FIG. 4 is a sectional view of the user interface device 110 in the image forming apparatus 100 when the user interface device 110 faces up. FIG. 5 is a sectional perspective view of the user interface device 110 in the image forming apparatus 100 when the user interface device 110 faces up. The member 125 disposed on the front surface side includes a first movable member 1251 whose position and posture change following the change of the posture or position of the user interface device 110, and a second movable member 1252 whose position changes following the change of the posture or position of the user interface device 110. That is, the first movable member 1251 moves its position upward from the state of FIGS. 2 and 3 following the change of the posture of the user interface device 110 to the facing-up posture. At the same time, the first movable member 1251 changes its posture with its upper end falling frontward. Thus, the sound passage space portion 122 inside the support body 111 can be prevented from communicating with the outside space. In addition, the second movable member 1252 moves its position upward from the state of FIGS. 2 and 3 following the change of the posture of the user interface device 110 to the facing-up posture. Thus, the sound passage space portion 122 inside the support body 111 can be prevented from communicating with the outside space.

Further, the first movable member 1251 and the second movable member 1252 are at least partially shaped like an arc when viewed from a vertical direction. Thus, when the user interface device 110 is turned (rotated) leftward/rightward, the first movable member 1251 and the second movable member 1252 can be prevented from interfering with any other member to thereby impede the rotation of the user interface device 110. The arc portion slides inside the support body 111 in a horizontal direction in accordance with the leftward/rightward rotation of the user interface device 110. On this occasion, the arc portion follows the change of the posture or position of the user interface device 110 so as to prevent the sound passage space portion 122 inside the support body 111 from communicating with the outside space.

Figure 6:
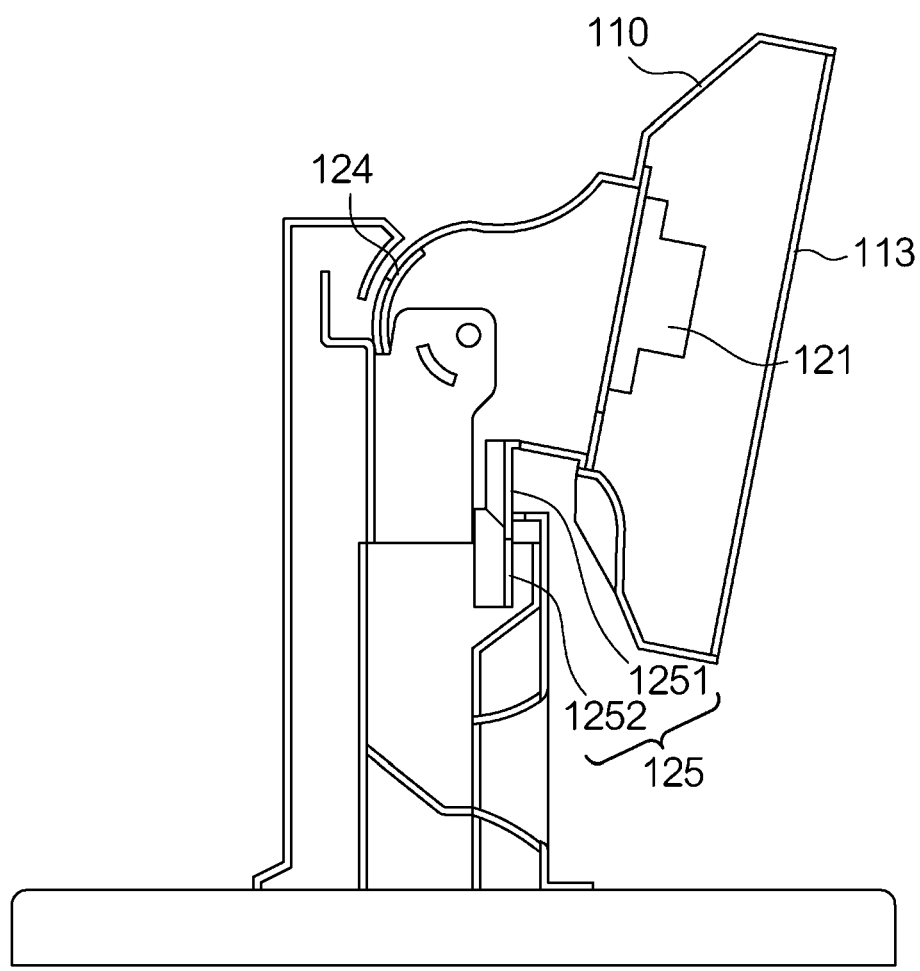
FIG. 6 is a sectional view of the user interface device in the image forming apparatus according to the first exemplary embodiment when the user interface device faces down.
Figure 7:
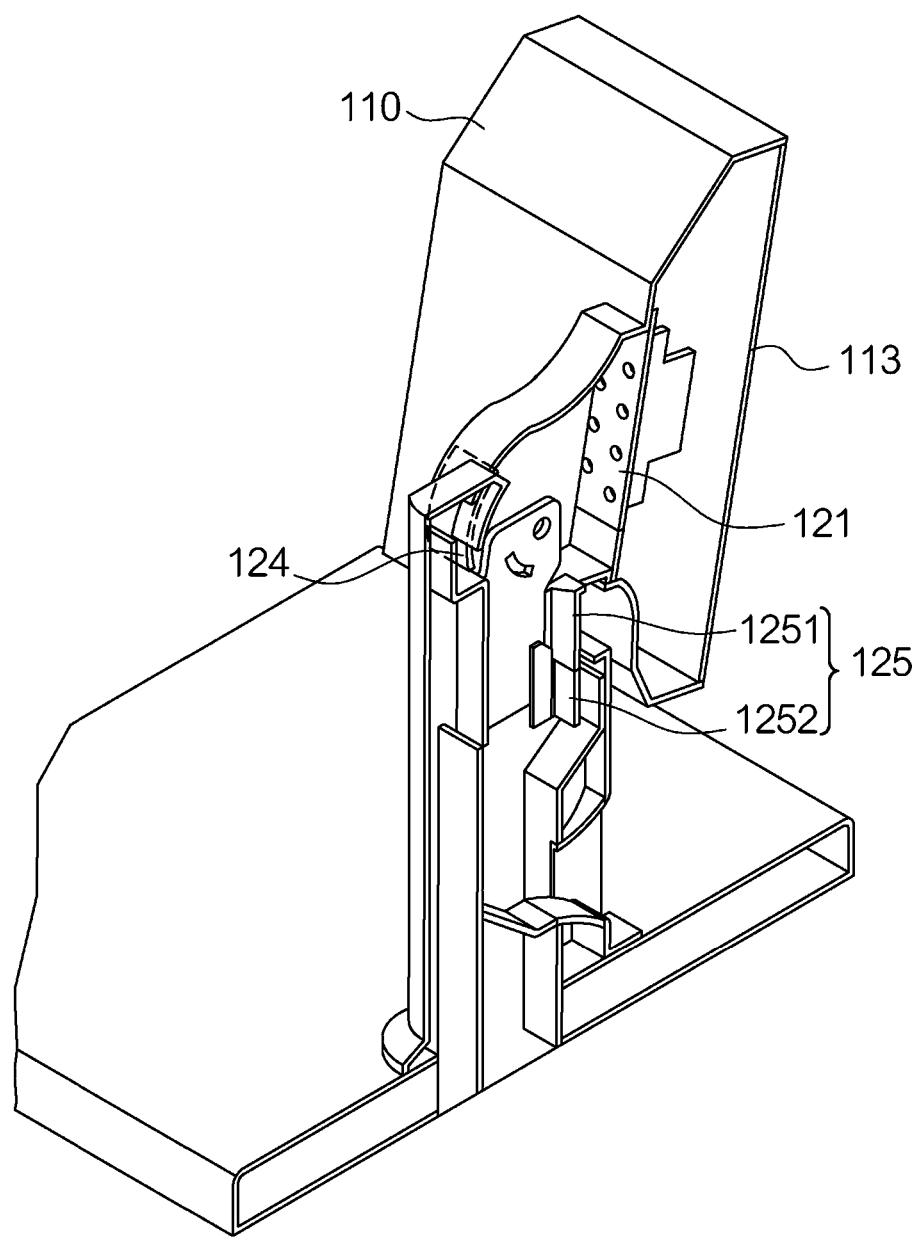
FIG. 7 is a sectional perspective view of the user interface device in the image forming apparatus according to the first exemplary embodiment when the user interface device faces down.

FIG. 6 is a sectional view of the user interface device 110 in the image forming apparatus 100 when the user interface device 110 faces down. FIG. 7 is a sectional perspective view of the user interface device 110 in the image forming apparatus 100 when the user interface device 110 faces down. The position and posture of the first movable member 1251 change following the change of the posture or position of the user interface device 110. The position of the second movable member 1252 changes following the change of the posture or position of the user interface device 110. That is, following the change of the posture of the user interface device 110 to the facing-down posture, the first movable member 1251 moves its position downward from the state of FIGS. 2 and 3 (or its upper end rises up from the state of FIGS. 4 and 5 toward the back surface side, and its position further moves downward) so that the sound passage space portion 122 inside the support body 111 can be prevented from communicating with the outside space. In addition, the second movable member 1252 moves its position downward from the state of FIGS. 2 and 3 following the change of the posture of the user interface device 110 to the facing-down posture so that the sound passage space portion 122 inside the support body 111 can be prevented from communicating with the outside space. In addition, on the occasion, the member 124 is disposed at a position where a gap may be generated among the plural members forming the sound passage space portion 122 when the posture or position of the user interface device 110 changes. Accordingly, the member 124 can close the sound passage space portion 122 with respect to the outside space of the support body 111.

According to the aforementioned first exemplary embodiment, the inside space of the support body 111 is utilized as the sound passage space portion 122 and a portion of the horn portion 112. When the horn portion 112 is made to carry directivity in this manner, sound is not transmitted to an unspecified large number of people but the sound whose sound pressure has been enhanced can be delivered to the user on the front surface side of the image forming apparatus 100 even if the sound is small.

[Modification]

The exemplary embodiment of the invention is not limited to the aforementioned first exemplary embodiment. For example, the exemplary embodiment of the invention may be any of the following modes. In addition, these modes may be combined with one another by using these modes together or replacing these modes partially if necessary.

Figure 8A:
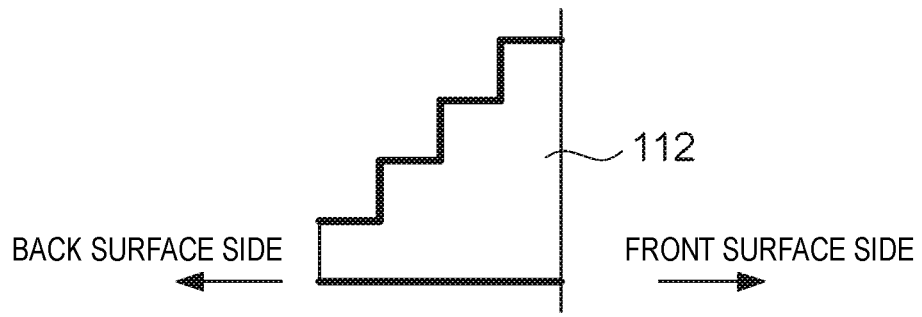
FIGS. 8A, 8B and 8C are vertical sectional views of horn portions according to the first exemplary embodiment.
Figure 8B:
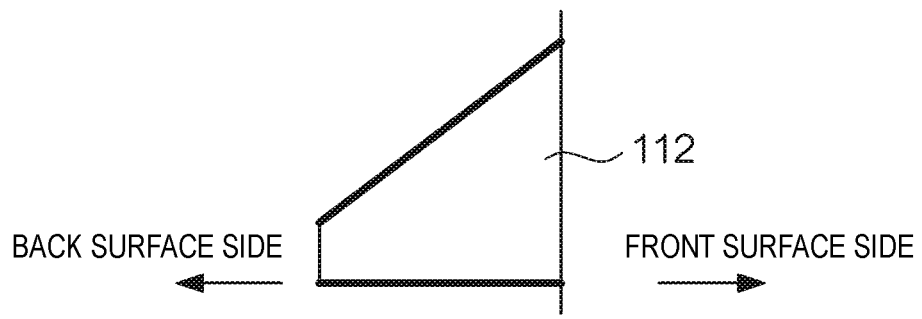
Figure 8C:
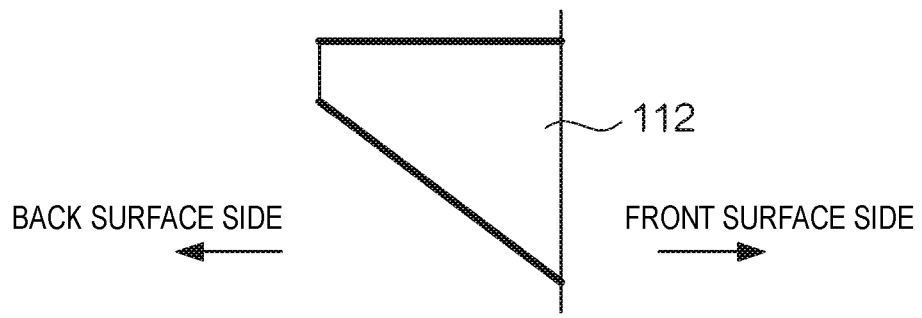

(1) The horn portion may be formed not into a so-called cone shape but into any shape if the shape is widened from the back surface side toward the front surface side. The horn portion may be formed into a shape which is widened stepwise toward the front surface, as illustrated in FIG. 8A. The horn portion may be formed into a shape which is widened only at an upper portion of the horn portion toward the front surface, as illustrated in FIG. 8B. The horn portion may be formed into a shape which is widened only at a lower portion of the horn portion toward the front surface, as illustrated in FIG. 8C. The configurations of FIG. 8A and FIG. 8B can make sound hardly resonate with the upper surface of the image forming apparatus, in comparison with the configuration of FIG. 8C. The configuration of FIG. 8C can make dust hardly enter the horn portion, in comparison with the configurations of FIG. 8A and FIG. 8B.

(2) The electronic apparatus according to the invention is not limited to the electrophotographic printer. Any apparatus may be used as the electronic apparatus according to the invention as long as the apparatus is provided with a speaker a user interface device, a support body and a sound emission controller. For example, any of a scanner, a facsimile apparatus, a washing machine, a television receiver etc. may correspond to the electronic apparatus according to the invention.

A second exemplary embodiment and a third exemplary embodiment will be described below in modes in each of which the image forming apparatus provided with the sound emitting device according to the invention is further provided with a display device byway of example. Description about the sound emitting device will be omitted in the second exemplary embodiment and the third exemplary embodiment.

Second Exemplary Embodiment

Figure 9:
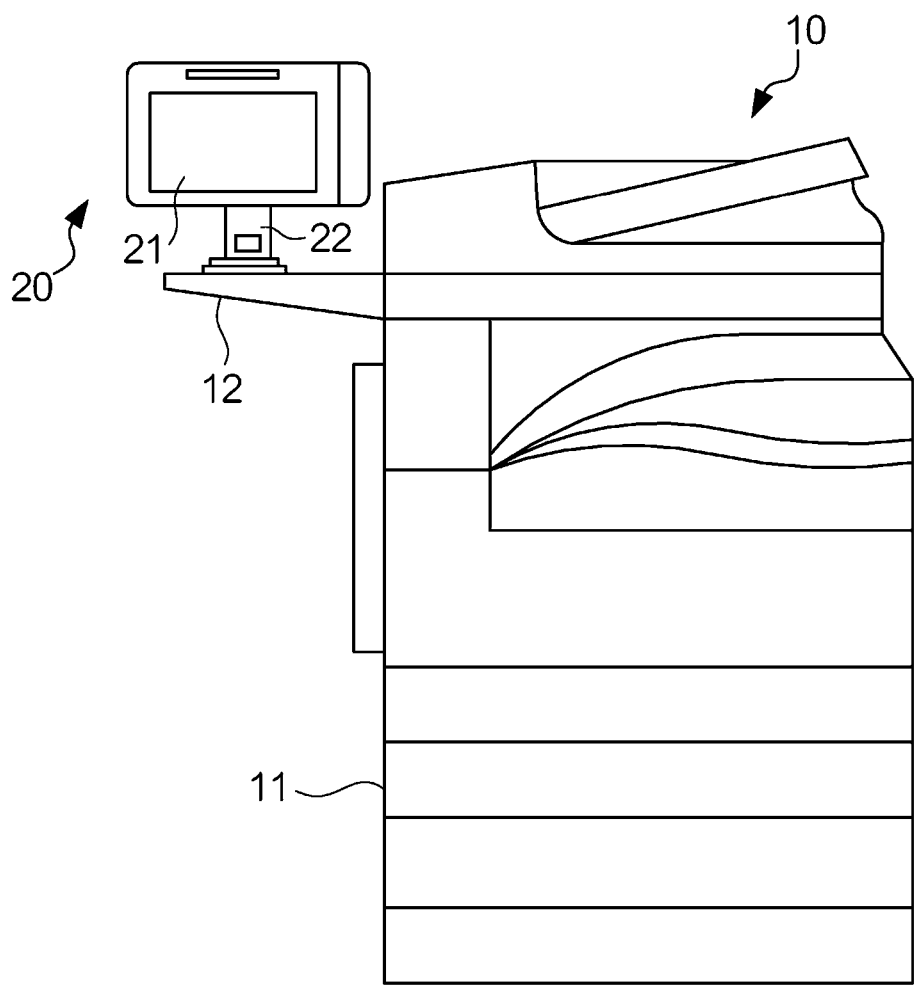
FIG. 9 is a front view illustrating an external appearance configuration of an image forming apparatus according to a second exemplary embodiment.

FIG. 9 is a front view illustrating an external appearance configuration of an image forming apparatus 10 that is an exemplary embodiment of the invention. The image forming apparatus 10 is an electrophotographic printer that corresponds to an example of the electronic apparatus according to the invention. The image forming apparatus 10 is provided with a user interface device 20 for accepting an operation from a user or displaying an image. At the same time, the image forming apparatus 10 is internally provided with an image forming unit that forms an image in response to the operation accepted by the user interface device 20. Incidentally, in the image forming apparatus 10, a side where the user operating the apparatus 10 stands is referred to as "front surface side", and an opposite side to the front surface side is referred to as "back surface side".

Figure 10A:
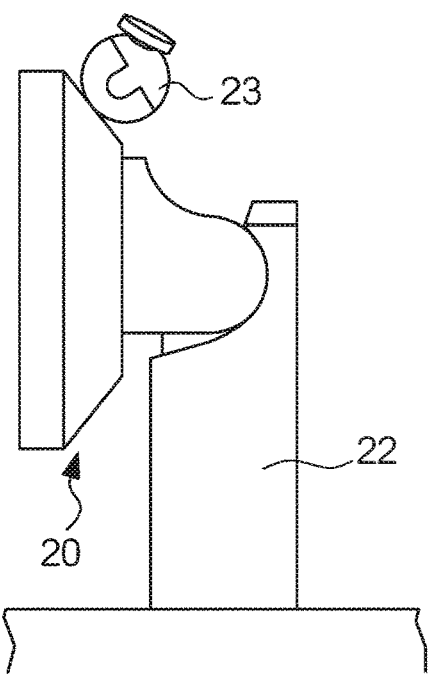
FIGS. 10A and 10B are a side view and a perspective view respectively for explaining an attachment position of a display device to a user interface device according to the second exemplary embodiment.
Figure 10B:
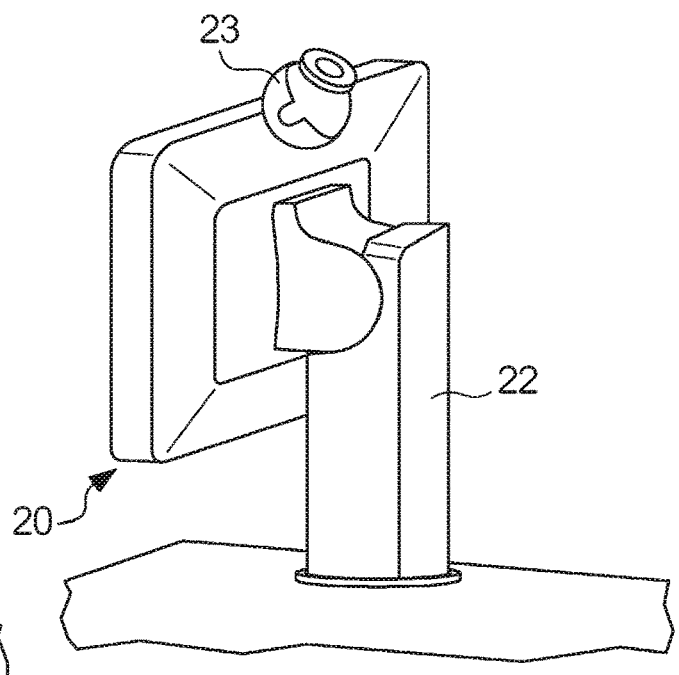

The user interface device 20 is supported on a stand 12 by a columnar support portion 22. The stand 12 is provided on a body 11 of the image forming apparatus 10. The user interface device 20 is provided with a touch screen 21 (second display device) on the front surface side, and provided with a display device 23 on the back surface side. As illustrated in FIGS. 10A and 10B, the display device 23 is provided at a central position of an upper portion of the user interface device 20 when seen from the back surface side. The display device 23 projects an image formed by light emitted from a light source onto any object such as a wall or a ceiling through an optical system including a lens etc. On this occasion, for example, a focal length, a projection range or a projection direction of the image can be changed without controlling any complicated mechanical structure. Thus, notification that can be visually seen easily can be performed toward a user at a distant place.

As illustrated in FIGS. 11A, 11B, 11C and 11D, the display device 23 is provided with a light source 231 (see FIG. 12) such as an LED, a support body 232, a posture changing body 233, an optical system 234 including a liquid crystal lens 237 and a controller 238 (see FIG. 12) and an adjustment mechanism 235. The support body 232 has a recess at least partially constituted by a curved surface such as a spherical surface. In addition, the support body 232 is fixed to a housing of the user interface device 20. The posture changing body 233 is at least partially constituted by a curved surface such as a spherical surface. The posture changing body 233 rotates in a state in which the curved surface of the posture changing body 233 has come into contact with the curved surface of the recess of the support body 232. Accordingly, the posture of the posture changing body 233 changes. The optical system 234 is provided in the posture changing body 233 to project an image formed by light emitted from the light source 231. The adjustment mechanism 235 adjusts a range where the image is projected through the optical system 234.

Figure 11A:
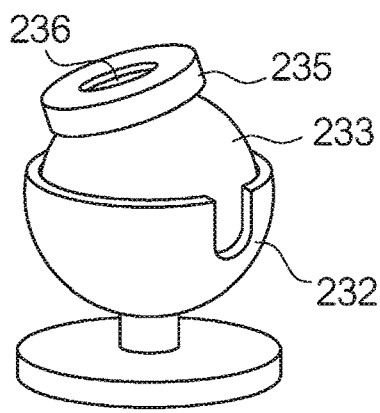
FIGS. 11A, 11B, 11C and 11D are perspective views for explaining an adjustment mechanism of the display device according to the second exemplary embodiment.
Figure 11B:
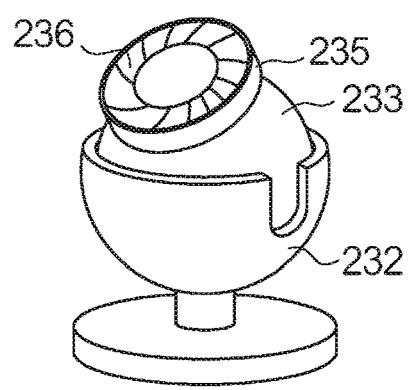
Figure 11C:
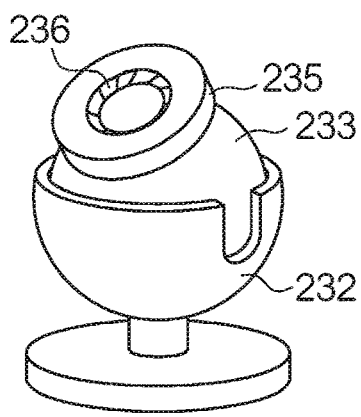
Figure 11D:
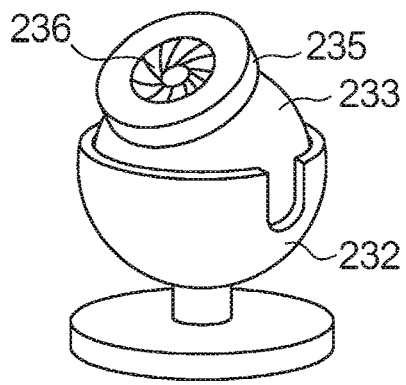

When the posture of the posture changing body 233 is changed by the user, a projection direction of the image is adjusted. In addition, when a circular dial of the adjustment mechanism 235 is rotated by the user, an opening range of a shutter 236 provided inside the dial is changed to a range of, for example, ϕ5 to ϕ16 (mm) in accordance with the rotation (FIGS. 11B to 11D). Thus, the projection range of the image is adjusted.

Figure 12:
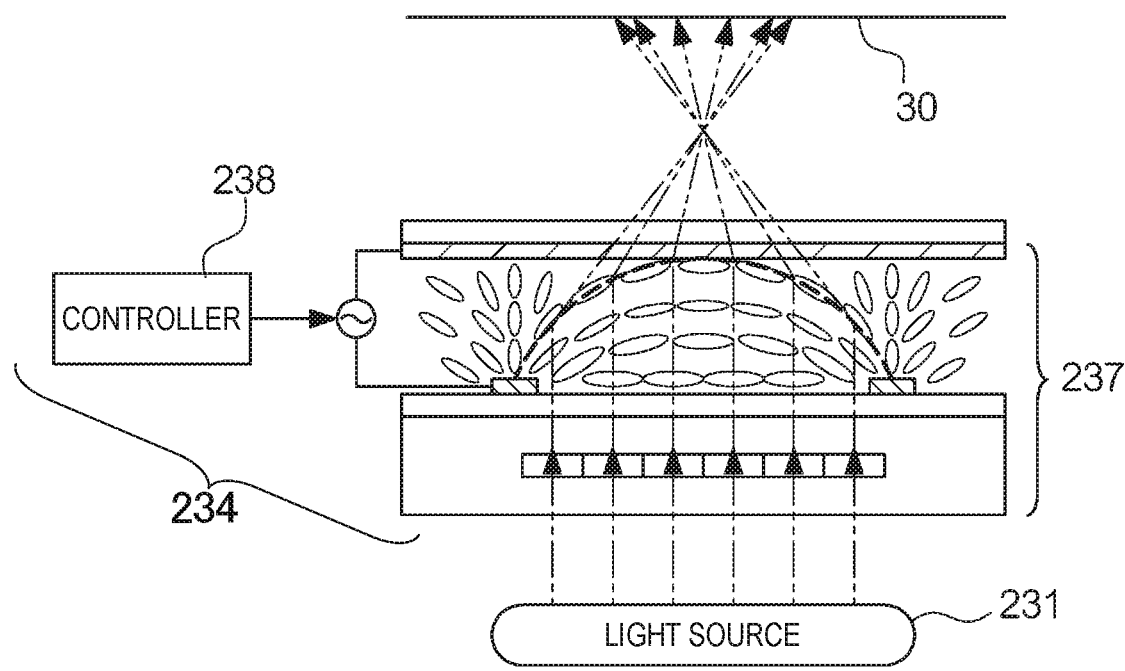
FIG. 12 is a sectional view for explaining a light source and an optical system of the display device according to the second exemplary embodiment.

As illustrated in FIG. 12, the display device 23 has an internal structure in which the light source 231 emitting light in a predetermined color and a liquid crystal lens 237 are laminated sequentially. Since states of liquid crystals sealed inside the liquid crystal lens 237 can be changed by application of a voltage, the liquid crystal lens 237 may also function as a convex lens, may also function as a concave lens, or may also function as a polarizing element. A controller 238 performing control of the display device 23 performs voltage application control on each of the liquid crystals inside the liquid crystal lens so as to provide an aimed refractive index. The voltage application control is performed on each of predetermined sections inside the liquid crystal lens in accordance with an electric signal issued to the power supply from the controller 238. Since the refractive index is changed from one section to another in the liquid crystal lens, the liquid crystal lens plays a role as a variable-focal length lens that can change a focal length in accordance with the electric signal. An optimal value of a parameter for determining the focal length can be set by the user. It is desirable that the set value is stored in a memory of the controller 238.

A predetermined color image formed by the light emitted from the light source 231 is projected onto an object 30 such as a ceiling. The color of the image on this occasion which, for example, means an error is projected onto any object such as a wall or a ceiling through the optical system including a notification lens etc. Even when the user seeing the color of the image is at a distant place, the user can know that an error has occurred in the image forming apparatus 10.

Incidentally, the light source 231 can be also lit, for example, in a blinking state or at a certain time interval by control of the controller 238 or may notify the user of the state of the image forming apparatus 10 by such a lighting pattern. In addition, different color light sources may be provided so that notification varying from one color to another can be performed by light emitted from one of the light sources.

According to the second exemplary embodiment, the light source or the liquid crystal lens can be driven by only the electric signal. Accordingly, no mechanism for controlling rotation, movement etc. of the light source 231 has to be provided in the display device 23. In addition, even without provision of any complicated large-scale mechanism structure, the projection direction or the projection range of the image can be changed.

Third Exemplary Embodiment

Figure 13:
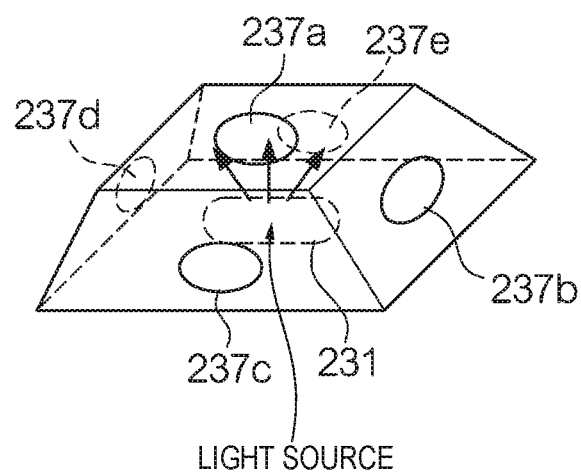
FIG. 13 is a view for explaining a structure of a display device according to a third exemplary embodiment.

The third exemplary embodiment is the same in configuration as the second exemplary embodiment except the structure of a display device 23. As illustrated in FIG. 13, the display device 23 according to the third exemplary embodiment has a structure in which plural liquid crystal lenses 237a to 237e having different directions (e.g. a front direction, an up direction, a back direction, a left direction and a right direction) as image projection directions respectively are attached in the surroundings of a light source 231. That is, the display device 23 according to the third exemplary embodiment is provided with plural optical systems which project an image formed by light emitted from the light source in the different directions respectively and each of which includes a variable-focal length lens capable of changing a corresponding focal length of the image in accordance with an electric signal.

Figure 14:
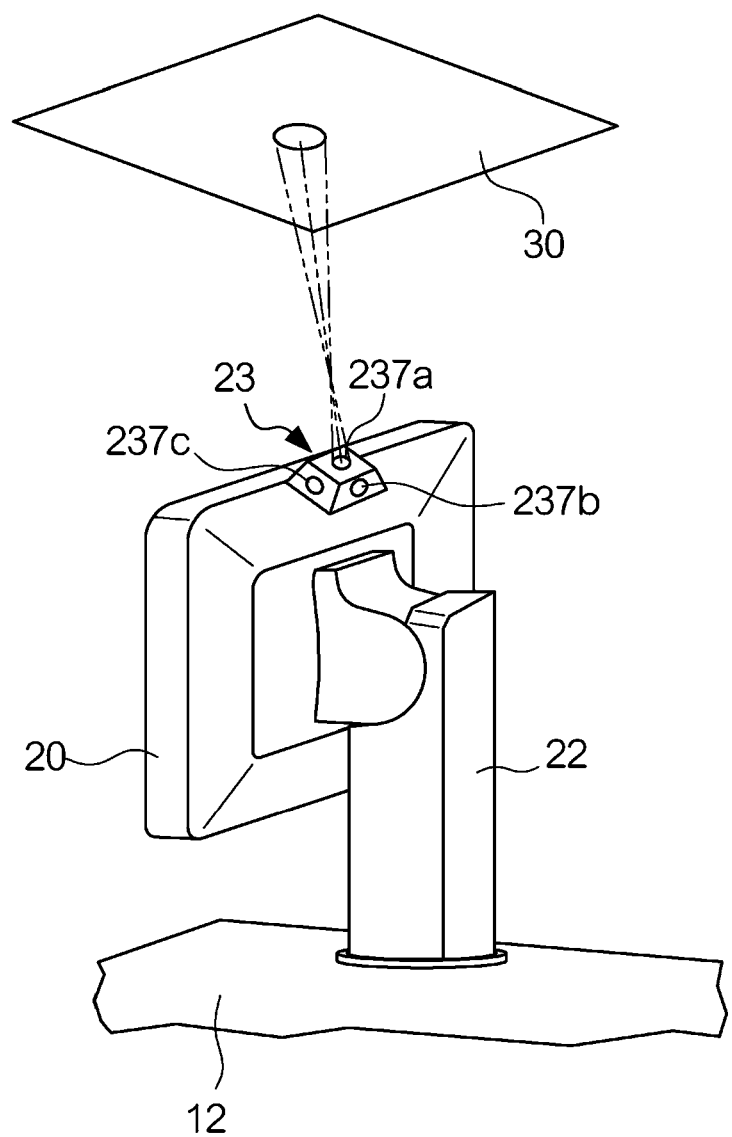
FIG. 14 is a perspective view illustrating a projection example of the display device according to the third exemplary embodiment.

As to, of the plural liquid crystal lenses 237a to 237e, one liquid crystal lens not projecting an image, a controller 238 can make control to extremely increase a refractive index of an entire liquid crystal region of the liquid crystal lens to thereby prevent the liquid crystal lens from projecting the image. In an example of FIG. 14, the controller 238 sets the liquid crystal lens 237a at a state in which the liquid crystal lens 237a is applied with a voltage so as to project the image, but sets the liquid crystal lenses 237b to 237e at a state in which the liquid crystal lenses 237b to 237e are applied with a voltage so as to block light from the light source 231. Thus, the image can be projected onto a ceiling serving as an object 30 with a focal length corresponding thereto. An optimal value of a parameter determining the focal length can be set by a user. It is desirable that the set value is stored in a memory of the controller 238.

Incidentally, the light source 231 can be also lit, for example, in a blinking state or at a certain time interval by control of the controller 238 or may notify the user of the state of the image forming apparatus 10 by such a lighting pattern. In addition, different color light sources may be provided so that notification varying from one color to another can be performed by light emitted by one of the light sources. In addition, different color optical filters may be provided for the liquid crystal lenses respectively so that an image can be projected through one of the liquid crystal lenses to thereby perform notification varying from one color to another.

According to the third exemplary embodiment, the light source or each of the liquid crystal lenses can be driven by only the electric signal. No mechanism for controlling rotation, movement, etc. of the light source 231 has to be provided in the display device 23. In addition, a projection direction of an image can be changed by only the electric signal. Incidentally, the second exemplary embodiment and the third exemplary embodiment may be combined. That is, the light source 231 and the plural liquid crystal lenses 237a to 237e according to the third exemplary embodiment may be mounted into the posture changing body 233 according to the second exemplary embodiment. With this configuration, a change of the posture of the posture changing body 233 and blockage of light in the liquid crystal lenses 237a to 237e may be used together to change the projection direction of the image.

[Modifications]

The exemplary embodiments of the invention are not limited to the aforementioned exemplary embodiments. For example, the exemplary embodiments of the invention may be the following modes. In addition, these modes may be combined with one another by using these modes together or replacing these modes partially if necessary.

The second exemplary embodiment and the third exemplary embodiment are examples in each of which a monochromatic image is projected. However, for example, any of images of characters, signs, figures etc. may be projected. For example, a character board in which a hole indicating a character etc. is formed may be disposed between the light source and each liquid crystal lens, and light emitted from the light source may be passed through only the hole of the character etc. so that an image meaning the character etc. can be projected. In addition, a liquid crystal panel may be disposed between the light source and the liquid crystal lens in advance, and the controller 238 may control the liquid crystal panel to generate a light-transmitted state and a light-blocked state in each of liquid crystal cells. In this case, the character etc. can be represented by light transmitted through the liquid crystal cells in the light-transmitted state. Thus, the user is notified, for example, of information such as the number of copies to be printed, that changes each time.

The controller 238 may operate together with a sensor detecting an environment surrounding the image forming apparatus 10 to thereby adjust luminance (projection luminance of an image) of light emitted from the light source or a projection direction of the image. For example, assume that the controller 238 operates together with a human sensor such as a pyroelectric sensor. When the user approaches the image forming apparatus 10 in this case, the controller 238 detecting the approach of the user through the human sensor can reduce the projection luminance of the image or project the image toward a range where the user can see easily.

Further, in the third exemplary embodiment, the image forming apparatus 10 may be provided with a blockage portion that blocks, of the plural optical systems projecting an image in different directions respectively, at least one optical system in accordance with the environment surrounding the image forming apparatus 10. For example, assume that the controller 238 operates together with a human sensor such as a pyroelectric sensor. When the user is in front of the image forming apparatus 10 in this case, only the optical system that can project the image onto a range where the user can easily see from the front position can be driven while the other optical systems projecting the image onto other ranges are blocked (optical paths to be connected to the image in the optical systems are blocked). Thus, only the necessary image can be projected. The blockage portion may be implemented by extremely increasing each of refractive indices of entire liquid crystal regions of the liquid crystal lenses not projecting the image to thereby set the liquid crystal lenses at a blocked state in which the liquid crystal lenses cannot project the image, as described in the third exemplary embodiment. Alternatively, the blockage portion may be configured to include a member movable between a position where the member blocks an optical path and a position where the member does not block the optical path in each of the optical systems.

What is claimed is:

1. A sound emitting device comprising:
   a speaker that is provided at a back surface of a user interface device;
   a support body that supports the user interface device;
   a horn portion that is provided in the support body and opened on a front surface side of the support body; and
   a space portion that is a space formed inside the support body and that extends from a sound emission region of the speaker to the horn portion,
   wherein the support body has a structure such that, when a posture or position of the user interface device with respect to the support body changes, the space portion remains unexposed to a space outside of the support body throughout the change.

2. The sound emitting device according to claim 1, wherein the support body comprises a reflective member in the space extending from the sound emission region of the speaker to the horn portion so that the reflective member reflects sound emitted from the speaker in a direction where the horn portion is located.

3. The sound emitting device according to claim 1, wherein:
   the support body is formed by a metal member and a resin member covering the metal member; and
   the horn portion is formed by a resin member and connected to the resin member forming the support body.

4. The sound emitting device according to claim 3, wherein:
   the metal material forming the support body is provided with a recess having a hollow shape opened to the resin member covering the metal member; and
   the horn portion is disposed in the recess.

5. The sound emitting device according to claim 3, wherein the horn portion has a shape that is widened from a back surface side toward the front surface side of the support body.

6. The sound emitting device according to claim 1, further comprising a display device comprising:
   a light source; and
   a plurality of optical systems that project an image formed by light emitted from the light source in different directions respectively and that comprise variable-focal length lenses capable of changing focal lengths of the image respectively in accordance with an electric signal.

7. An image forming apparatus comprising:
   the sound emitting device according to claim 1;
   the user interface device; and
   a sound emission controller that controls sound emission performed by the sound emitting device.

8. The image forming apparatus according to claim 7, wherein the horn portion is provided between a housing surface at an upper portion of the image forming apparatus and the user interface device.

9. An image forming apparatus comprising:
   the sound emitting device according to claim 6;
   the user interface device;
   a sound emission controller that controls sound emission performed by the sound emitting device; and
   a blockage portion that blocks, of the plurality of optical systems projecting the image in the different directions respectively, at least one optical system in accordance with an environment surrounding the image forming apparatus.

10. An electronic apparatus comprising:
    the sound emitting device according to claim 1;
    the user interface device; and
    a sound emission controller that controls sound emission performed by the sound emitting device.

11. A sound emitting device comprising:
    a speaker that is provided at a back surface of a user interface device;
    a support body that supports the user interface device;
    a horn portion that is provided in the support body and opened on a front surface side of the support body; and
    a space portion that is a space formed inside the support body and that extends from a sound emission region of the speaker to the horn portion,
    wherein the support body comprises:
      a plurality of members forming the space portion and configured such that a gap forms between two members among the plurality of members when a posture or position of the user interface device changes, and
      a cover member that is not included in the plurality of members and that covers the gap formed between the two members when the posture or position of the user interface device changes such that the gap is closed off from a space outside of the support body throughout the change.

12. The sound emitting device according to claim 11, wherein the cover member is a movable member that moves during the change of the posture or position of the user interface device so that the gap that is formed between the two members when the posture or position of the user interface device changes is closed off from the space outside of the support body by the movable member.

13. The sound emitting device according to claim 12, wherein the movable member comprises:
    a first movable member whose position and posture change during the change of the posture or position of the user interface device; and
    a second movable member that is coupled to the first movable member and whose position changes during the change of the posture or position of the user interface device.

14. A sound emitting device comprising:
    a speaker that is provided at a back surface of a user interface device;
    a support body that supports the user interface device;
    a horn portion that is provided in the support body;
    a space portion that is a space formed inside the support body and extending from a sound emission region of the speaker to the horn portion; and
    a display device comprising:

a light source;

a display device support body that has a recess at least partially constituted by a curved surface;

a posture changing body that is at least partially constituted by a curved surface and that rotates in a state in which the curved surface has come into contact with the curved surface of the recess of the display device support body so that a posture of the posture changing body changes;

an optical system that is provided in the posture changing body to project an image formed by light emitted from the light source; and an adjustment mechanism that adjusts a range where an image is projected from the optical system.

15. The sound emitting device according to claim 14, wherein the optical system comprises a variable-focal length lens that is capable of changing a focal length in accordance with an electric signal.

16. An image forming apparatus comprising:

the sound emitting device according to claim 14;

the user interface device; and a sound emission controller that controls sound emission performed by the sound emitting device.

17. The image forming apparatus according to claim 16, wherein the horn portion is provided between a housing surface at an upper portion of the image forming apparatus and the user interface device.

18. The image forming apparatus according to claim 16, wherein at least one of an image projection range, image projection luminance and an image projection direction carried out by the display device is controlled in accordance with an environment surrounding the image forming apparatus.

* * * * *